(12) United States Patent
Manslow et al.

(10) Patent No.: US 9,465,119 B2
(45) Date of Patent: Oct. 11, 2016

(54) GAMMA-RAY SPECTROMETER

(71) Applicant: Symetrica Limited, Southhampton Hampshire (GB)

(72) Inventors: John Manslow, Southhampton (GB); David Ramsden, Southhampton (GB)

(73) Assignee: Symetrica Limited, Southampton (GB)

( * ) Notice: Subject to any disclaimer, the term of this patent is extended or adjusted under 35 U.S.C. 154(b) by 51 days.

(21) Appl. No.: 14/420,624

(22) PCT Filed: Aug. 7, 2013

(86) PCT No.: PCT/GB2013/052102
§ 371 (c)(1),
(2) Date: Feb. 9, 2015

(87) PCT Pub. No.: WO2014/023954
PCT Pub. Date: Feb. 13, 2014

(65) Prior Publication Data
US 2015/0212218 A1    Jul. 30, 2015

(30) Foreign Application Priority Data
Aug. 10, 2012    (GB) .................................. 1214320.2

(51) Int. Cl.
*G01T 1/40*    (2006.01)
*G01T 1/36*    (2006.01)

(52) U.S. Cl.
CPC *G01T 1/40* (2013.01); *G01T 1/362* (2013.01)

(58) Field of Classification Search
CPC ................................. G01T 1/40; G01T 1/362
See application file for complete search history.

(56) References Cited

U.S. PATENT DOCUMENTS 4,256,960 A * 3/1981 Snider .................. G01T 1/1642
250/252.1
4,433,240 A    2/1984 Seeman (Continued)

FOREIGN PATENT DOCUMENTS

| EP | 0 068 581 A1 | 5/1983 |
|---|---|---|
| EP | 0 203 325 A3 | 3/1986 |
| EP | 0 416 970 A2 | 3/1991 |

OTHER PUBLICATIONS

E.R. Siciliano et al.; Energy Calibration of Gamma-Ray in Plastic Scintillators Usng Compton Kinematics; Nuclear Instruments and Methods in Physics Research A 594; 2008; pp. 232-243; Elsevier B.V.; Richmand, WA, USA.

(Continued)

*Primary Examiner* — David Porta
*Assistant Examiner* — Faye Boosalis
(74) *Attorney, Agent, or Firm* — Fitzsimmons IP Law

(57) ABSTRACT

An apparatus is described. The apparatus comprising a gamma-ray spectrometer arranged to receive gamma-rays from a calibration source, the gamma-ray spectrometer comprising: a scintillator material optically coupled to two or more photomultipliers, the two or more photomultipliers being arranged to detect photons generated in the scintillator material associated with gamma-ray interactions between the scintillator material and gamma-rays received from the calibration source, wherein the two or more photomultipliers are operable to output respective detection signals associated with the gamma-ray interactions; the apparatus further comprising: a switch coupled to receive the respective detection signals from the two or more photomultipliers and operable to select detection signals from one of the two or more photomultipliers; and a stabilization circuit coupled to the switch and operable to receive the selected detection signal of the respective photomultiplier and to stabilize the gain of the photomultiplier that output the selected detection signal based on the detection signals.

13 Claims, 1 Drawing Sheet

(56) References Cited

U.S. PATENT DOCUMENTS

| | | | |
|---|---|---|---|
| 4,857,722 A | 8/1989 | Kumazawa et al. | |
| 5,550,377 A | 8/1996 | Petrillo et al. | |
| 5,677,536 A | 10/1997 | Vickers | |
| 7,297,957 B1 | 11/2007 | Vickers et al. | |
| 2004/0016884 A1* | 1/2004 | Williams | G01T 1/2985 250/363.09 |
| 2010/0305873 A1 | 12/2010 | Sjoden et al. | |

OTHER PUBLICATIONS

N. Kudomi; Energy Calibration of Plastic Scintillators for Low Energy Electrons by Using Compton Scattering of Gamma Rays; Nuclear Instruments and Methods in Physics Research A 430; 1999; pp. 96-99; Elsevier Science B.V., Osaka, Japan.

G. Pausch et al.; Characterization and Calibration of Large-Volume PVT Detectors by Backscatter Gating; IEEE Nuclear Sciense Symposium Conference Records; 2011; pp. 2214-2219; IEEE; Valencia, CA, USA.

R.D. Bolton et al.; A 207Bi Light Pulser for Stabilisation of Scintillators and Lead-Glass Cherenkov Detectors; Nuclear Instruments and Methods in Physics Research A 174; 1980; pp. 411-419 (see Abstract); Netherlands.

Y. Wang et al.; An Iterative Energy-Centroid Method for Recalibration of PMT Gain in PET or Gamma Camera; IEEE; 2002; pp. 1965-1968; IEEE; USA.

* cited by examiner

GAMMA-RAY SPECTROMETER

BACKGROUND ART

The invention relates generally to gamma-ray spectrometers.

Large volume plastic gamma-ray spectrometers constructed using, for example, polyvinyltoluene or polystyrene scintillation material, are being accepted as valid detectors for screening large cargo containers, trucks and trains at ports and other border crossing points. GB 2437979 describes how such detectors might be designed in order to maximise the efficiency with which the scintillation light from a gamma-ray interaction can be collected and demonstrates how the variance in the light-collection efficiency can be minimised. GB 2418015 shows how the most probable spectrum of the incident gamma-rays could be derived from the recoded energy-loss spectrum. The quality of that incident spectrum is such that in many cases it is possible to identify the nature of the radioactivity detected in the cargo. In the radiation detection industry, one goal is to develop a polyvinyl toluene (PVT) can be doped with anthracene to produce a plastic scintillator. When subjected to ionizing radiation (both particle PVT-based system able to identify naturally occurring radioactive materials (NORM) during primary screening to avoid sending the vehicle to a more costly secondary screening process in order to determine whether or not the cargo is safe. The current threshold for the detection of radioactivity in cargo is such that the number of counts detected in a single 20 liter PVT detector is, for example, of the order of 2000 counts per 5 second transit. The sparseness of this data means that it is typical to sum the energy-loss spectrum from four or more large volume PVT detectors.

For this summing process to be useful and not blur the incident gamma-ray spectrum, the energy-scales on each spectrum should be accurately co-aligned. Furthermore, since each of the large detectors is viewed by a number of photomultiplier tubes (e.g., 4 to 8 photomultiplier tubes), in order to maximise the light collection-efficiency of the detector, the gain of each of the photomultiplier tubes is typically normalised so that the overall energy-response of the individual spectrometers is not only uniform across the entire detector surface but is also compensated as the environmental temperature changes or the system ages.

The problem of calibrating the energy-loss spectra generated by a PVT detector is difficult to solve accurately. Often this task is made more difficult by the poor optical design of the large-volume detectors. This means that the quality of the spectra are often so poor that the detailed features used in some calibration methods are difficult to implement. Papers by Kudomi [1] and Siciliano et al. [2] describe how to use features in the energy-loss spectrum of a known monochromatic source of gamma-rays to calibrate the spectrum. A different approach to the calibration of PVT detectors involves the use of a 207Bi source [3]. This generates three monochromatic electrons through an internal-conversion process. More recently, G Pausch et al. [4] have described a stabilisation technique that employs a radioactive calibration source and a secondary scintillation counter to measure the energy of the photon that has been scattered in the PVT.

Therefore, there is a need for an improved technique for more accurately calibrating large scale detectors.

SUMMARY OF THE INVENTION

According to a first aspect of the invention there is provided an apparatus comprising a gamma-ray spectrometer arranged to receive gamma-rays from a calibration source, the gamma-ray spectrometer comprising: a scintillator material optically coupled to two or more photomultipliers, the two or more photomultipliers being arranged to detect photons generated in the scintillator material associated with gamma-ray interactions between the scintillator material and gamma-rays received from the calibration source, wherein the two or more photomultipliers are operable to output respective detection signals associated with the gamma-ray interactions; the apparatus further comprising: a switch coupled to receive the respective detection signals from the two or more photomultipliers and operable to select detection signals from one of the two or more photomultipliers; and a stabilization circuit coupled to the switch and operable to receive the selected detection signal of the respective photomultiplier and to stabilize the gain of the photomultiplier that output the selected detection signals based on the detection signals. Accordingly it is possible to stablise the detection using a large scale detector observed with multiple photomultipliers with a single calibration circuit.

In accordance with some embodiments the stabilization circuit is operable to generate and output a control signal to the switch for selecting the detection signals of one of the two or more photomultipliers.

In accordance with some embodiments the stabilization circuit is operable to generate a gain-change signal for the photomultiplier associated with the selected detection signals based on a comparison of an observed energy spectrum calculated from the selected detection signals and a reference energy spectrum of the calibration source.

In accordance with some embodiments the control circuit is operable to output the gain-change signal to the photomultiplier associated with the selected detection signals.

In accordance with some embodiments the apparatus comprising a data acquisition circuit operable to process the selected detection signals associated with a radioactive material in the calibration source and output an energy spectrum associated with the radioactive material in the calibration source.

In accordance with some embodiments the stabilization circuit is operable to compare Compton-edges of the observed energy spectrum and the reference energy spectrum of the radioactive material in the calibration source.

In accordance with some embodiments the stabilization circuit is operable to compare the median channel of the reference energy spectrum and the median channel of the observed energy spectrum.

In accordance with some embodiments the stabilization circuit is operable to rescale the energy axis of the observed energy spectrum and measure the difference between the rescaled energy spectrum and the reference energy spectrum.

In accordance with some embodiments the stabilization circuit is operable to rescale the calibration spectrum with reference to the reference spectrum and compare the shape of the rescaled calibration spectrum with the shape of the reference spectrum.

In accordance with some embodiments the stabilization circuit is operable to compare the median channel of the reference energy spectrum and the median channel of the observed energy spectrum, rescale the energy axis of the observed energy spectrum and measure the difference between the rescaled energy spectrum and the reference energy spectrum, and determine if a gain-change estimated from the medians is consistent with a gain change estimated by rescaling the energy spectrums.

In accordance with some embodiments the stabilization circuit is operable to compare the count-rate observed in the observed energy spectrum with the count-rate observed in the reference energy spectrum.

In accordance with some embodiments each of the two or more photomultipliers comprises an amplifier.

According to a second aspect of the invention there is provided a method for calibrating a gamma-ray spectrometer, comprising the steps of: providing a gamma-ray spectrometer arranged to receive gamma-rays from a calibration source; the gamma-ray spectrometer comprising: a scintillator material optically coupled to two or more photomultipliers, the two or more photomultipliers being arranged to detect photons generated in the scintillator material associated with gamma-ray interactions between the scintillator material and gamma-rays received from the calibration source, wherein the two or more photomultipliers are operable to output respective detection signals associated with the gamma-ray interactions; detecting photons generated in the scintillator material associated with gamma-ray interactions between the scintillator material and gamma-rays received from the calibration source; selecting detection signals from one of the two or more photomultipliers; and stabilizing the gain of the photomultiplier that output the selected detection signals based on the detection signals.

BRIEF DESCRIPTION OF THE DRAWINGS

For a better understanding of the invention and to show how the same may be carried into effect reference is now made by way of example only to the accompanying drawings in which.

DETAILED DESCRIPTION

Figure 1:
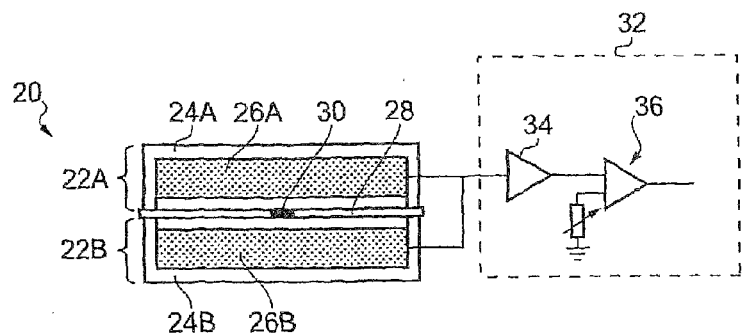
FIG. 1 schematically shows a calibration source according to an embodiment of the invention.

FIG. 1 schematically shows a calibration source 20 according to an embodiment of the invention. The calibration source is described in further detail in granted patent GB 2463707. The calibration source 20 is based around a deposit of radioactive material 30 comprising a radioactive isotope having a decay transition associated with emission of a radiation particle and a gamma-ray. In this example, the radioactive material comprises a salt of Na-22. Na-22 is associated with a radioactive transition that results in emission of a beta-plus particle (positron) having a maximum energy of around 545 keV, and a gamma-ray having an energy around 1274 keV. Subsequent matter-anti-matter annihilation of the positron further results in the emission of a pair of 511 keV gamma-rays. In this example the radioactive material 30 has an activity of around 100 Bq. This will of course reduce with time, with Na-22 having a half-life of around 2.6 years.

The radioactive material 30 is mounted on a substrate 28. In this example, the substrate 28 comprises a thin (e.g. <<1 mm, for example 0.05 mm) plastic (e.g. polyester) or metal sheet with the radioactive material in the form of a salt deposited thereon. The radioactive material 30 is laminated over to seal the radioactive material 30 in a polyester envelope in this example.

The substrate 28 is sandwiched between two solid state silicon detector elements 22A, 22B so as to provide a solid state detector generally surrounding the radioactive material 30 and so arranged to receive positrons emitted by the radioactive material 30. In this example, the two solid state silicon detector elements 22A, 22B each comprise broadly conventional and commercially available P-Intrinsic-N (PIN) photo-diodes. For example, in one embodiment the inventors have used solid-state detectors based on the S3590-19 model available from Hamamatsu Photonics K.K.®. The solid-state detectors are operated, e.g. supplied with power, in accordance with their normal operation for photon detection. The silicon detector elements 22A, 22B each comprise a silicon-based detector crystal 26A, 26B mounted in a cup-like ceramic housing 24A, 24B, thus leaving one face of the respective detector crystals 26A, 26B exposed. The exposed faces are those facing the radioactive source 30. The faces of the detector crystals 26A, 26B exposed by their respective housings 24A, 24B are, in this example, naked. That is to say, the detector surfaces are not encased in a resin encapsulant. In the configuration shown in FIG. 1, the exposed faces are perpendicular to the plane of the figure. The faces in this example are generally square with a side length of around 10 mm. In other embodiments different shaped detectors may be used in place of the detectors 22A, 22B. For example, generally circular detectors having a similar characteristic extent, e.g. having a diameter of around 10 mm, may be used. The exposed faces of the silicon crystals 26A, 26B are separated from one another in this example by around 0.6 mm. The overall thickness of the detector assembly in this embodiment is around 3.6 mm.

The characteristic extent of the radioactive source material 30 is relatively small compared to the characteristic extent of the detector crystals 26A, 26B. The radioactive source material 30 is positioned broadly adjacent the centres of the two detector crystals 26A, 26B. Thus the overall sensitive region of the detector assembly subtends a solid angle seen by the radioactive source which is approaching 4π steradians, e.g. in excess of 95% of a closed surface around the radioactive material 30 for the geometry shown in FIG. 1.

Signal output lines from the detectors are 22A, 22B are coupled together and to a gating circuit 32. The gating circuit 32 comprises a signal amplifier 34 for amplifying signals from the detectors 22A, 22B. The amplifier may be of any kind conventionally used with PIN photo-diodes. The output from the amplifier 34 is coupled to an input of a discriminator 36. The discriminator 36 may similarly be of any conventional kind and is configured to output a logic-level indication when the input to the discriminator 36 from the amplifier 34 exceeds a threshold level, e.g. a desired threshold voltage selected by adjusting a variable resistor associated with the discriminator 36.

When multiple tubes are used to view a large volume spectrometer, a tagged calibration source is positioned so that the energy-deposited in the large volume spectrometer from the calibration source is equally visible to all PM tubes of the large volume spectrometer.

Figure 2:
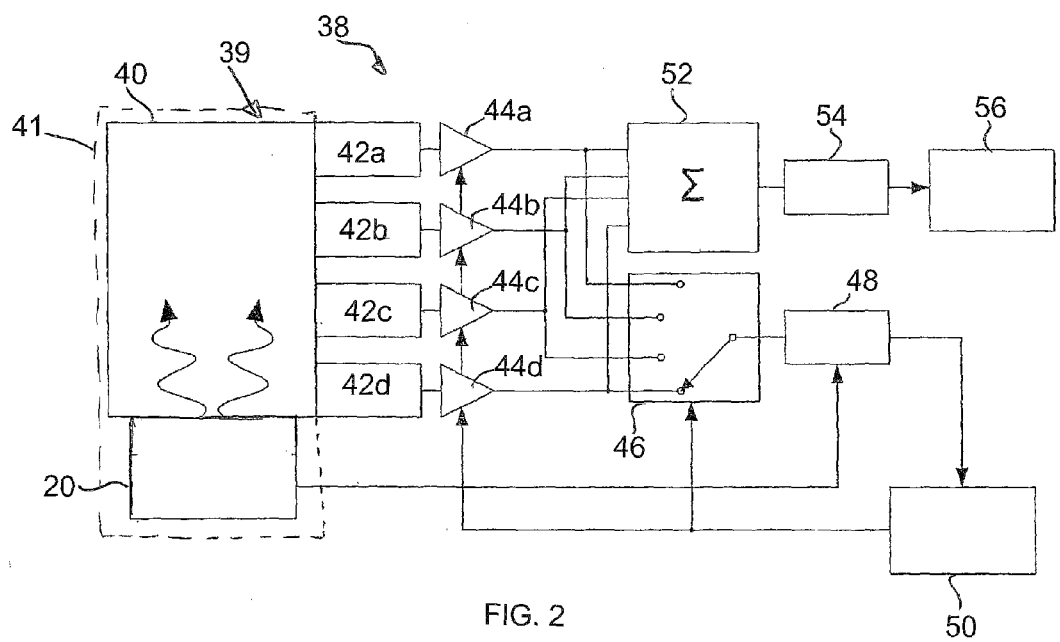
FIG. 2 schematically shows an apparatus comprising the calibration source and a gamma-ray spectrometer according to an embodiment of the invention.

FIG. 2 schematically shows a detector apparatus 38 comprising the calibration source 20 and a gamma-ray spectrometer 39. The calibration source 20 and the gamma-ray spectrometer 39 are not shown to scale. In this example the gamma-ray spectrometer 39 is a scintillator crystal-based gamma-ray spectrometer, but similar principles can be applied for response-stabilisation of other gamma-ray spectrometers based on other technologies, e.g. based on hyper-pure germanium detectors. The calibration source 20 and components of the gamma-ray spectrometer 39 are in this example contained within a common housing 41, e.g., an aluminium casing, so as to provide a self-contained apparatus comprising a combined calibration source and gamma-ray spectrometer. In the more general case, the calibration source and in spectrometer may be in separate housings. For example, the spectrometer may be of a conventional design within a conventional housing, and the calibration source may simply be attached or held against a side of the spectrometer housing.

The spectrometer component 39 of the apparatus 38 comprises a conventional plastic (e.g. Polyvinyltoluene or PVT) scintillation counter 40 which scintillates when a gamma-ray is absorbed within it. In this example, the scintillation material is a large piece of doped polyvinyltoluene. Other scintillator plastics, could equally be used. The scintillation counter 40 in this example has approximate dimensions of 1500×400×50 mm.

The scintillation counter 40 is optically coupled to four photomultiplier tubes (PMT) 42a, 42b, 42c, 42d in any of the usual ways, e.g. directly or via an optical coupling element. Four PMTs are shown in this example. However, a different number of two or more PMTs may be used according to the size of the scintillation counter. In other examples, a solid state photo-detector may replace the PMTs 42a, 42b, 42c, 42d. The scintillation crystal 40 is mounted in the housing 41. As is conventional, gamma-rays interact with the scintillation counter 40 in scintillation events in which optical photons are generated. Each of the PMTs 42a, 42b, 42c, 42d is operable to output a signal S indicative of the intensity of the scintillation flash generated in the crystal 40 in response to each gamma-ray interaction. In this example, the output signal from each PMT is based on an integration time of around 1.5 μS, that is to say, the initial signal processing component of the PMTs 42a, 42b, 42c, 42d (not shown in the figure) integrates the signal (current) seen at the anode of the PMT for around 1.5 μS to provide the output signal S. This integration time is based, for example, on the temporal response characteristics of the scintillation counter 40 in the usual way.

The remainder of the apparatus 38 shown in FIG. 2 has two distinct functions. The first function is related to the calibration of the PMTs and comprises a switch 46, a multi-channel analyser (MCA) 48 and control electronics 50. The second function is related to performing an analysis of the gamma-ray sources, other than the calibration source, and comprises a summation apparatus 52, an MCA 54 and a data analysis processor 56. The summation of the coincident signals from each of the PMTs in this example is performed using one or more high frequency summing amplifiers (e.g. AD8130ARZ). However, it will be appreciated that other techniques known to those skilled in the art for summing the coincident signals may be used.

The arrangement of the first element related to calibration is now described. The switch 46 is arranged to receive the individual outputs from each of the PMTs 42a, 42b, 42c, 42d. In the example, the output of each PMT is fed to an amplifier 44a, 44b, 44c, 44d. Each of the amplifiers 44a, 44b, 44c, 44d in this example comprise an analogue multiplier (e.g. AD835ARZ) that is controlled by an individual output or analogue gain change signal from the data analysis processor 50 to increase or decrease the gain. However, it will be appreciated that other gain change techniques may be used. In this example a separate amplifier and PMT are used, however, it will be appreciated that the PMT might include a gain element or amplifier such that separate amplifiers are not required for each PMT.

The switch 46 comprises a number of analogue gates controlled by the data-processing unit 50 to select one of the PMTs 42a, 42b, 42c, 42d to calibrate. That is to say that the switch is used to select an output from one of the amplifiers 44a, 44b, 44c, 44d coupled to a respective PMT to calibrate. In this example, switch 46 is provided by an integrated multiplexer (e.g., AD8184ARZ). The switch 46 is a multiplexer in this example, but may be a series of individual switches (i.e. not integrated), one for each PMT, such that selection of a PMT involves turning all the switches to an off-position and turning a switch associated with a selected PMT to an on-position. In an alternative embodiment, each of the PMTs is connected directly to an individual MCA and the output from each individual MCA is fed to the control electronics 50 to control the gain of the amplifiers. In this case, the control electronics provides the switching function to select individual channels for calibration. In this example the output of the multiplexer (i.e., switch 46) is coupled to the MCA 48.

The MCA 48 is arranged to receive gating signals G from the gating circuit of the calibration source 20 and output signals S from the PMTs 42a, 42b, 42c, 42d of the spectrometer 39 via the switch 46. It will be appreciated that the various functional blocks shown in FIG. 2 are shown separately for ease of explanation. In some embodiments the functionality of these elements may, for example, be provided by a single hardware element, e.g. a suitably programmed processor of a general purpose computer.

Control circuit or processor 50 is coupled to the MCA 48 and receives digital pulse-height data, generated by an ADC stage in the multichannel analyser. The processor or controller 50 is operable to provide a control signal for the switch 46 to select one of the PMTs to calibrate the detector 38 and also to provide the signal (gain-change signal) to adjust the gain of each amplifier of the respective PMTs 42a, 42b, 42c, 42d. In the figure a single connection is shown going to all amplifiers 44a, 44b, 44c, 44d, but it will be appreciated that individual control signals will be fed to each amplifier.

The process of using the calibration function to stabilise the outputs from the PMT tubes is now described. As described in GB 2463707, the weak Na-22 radio-active source decays with the simultaneous emission of a positron and a 1274 keV gamma photon. This source is used to provide a tagging signal through the direct detection of the positron in a pair of unencapsulated silicon PIN-diodes.

The control electronics 50 selects one of the PMTs to stabilise or calibrate by controlling the switch 46. As shown in the figure, the lower PMT 42d and associated amplifier 44d is selected. When a tagging signal G in the form of a logic-level signal is received from the tagged gamma-ray source, the MCA 48 feeds the digital pulse-height data, generated by the ADC stage in the MCA to the control electronics 50, where an energy loss spectrum is recorded. After a sufficient number of calibration events have been recorded, typically 25,000, a spectrum is generated and used to stabilise the gain of the selected PMT.

The MCA 48 is operable to generate an energy-loss spectrum or calibration/observed spectrum for the calibration signal events, for example in the usual way and in accordance with a nominally assumed calibration function for the spectrometer. However, significantly there are only a few possible energy depositions that can be associated with the calibration events, and furthermore these energies are known (or at least their respective maxima are known). These are:

(i) 0 keV when none of the three gamma-rays interact with the scintillation detector 40, i.e., they all "miss";

(ii) The Compton continuum associated with the interactions of one of the 511 keV annihilation gamma-rays (γ1A, γ2A) interacts with the scintillation crystal;

(iii) The Compton continuum associated with the interaction of the 1274 keV decay gamma-ray from the $^{22}$Na source, $\gamma_D$, interacts with the scintillation counter;

(iv) The Compton continuum associated with the simultaneous detection of one of the annihilation gamma-rays γ1A, γ2A (511 KeV) and the decay gamma-ray $\gamma_D$ (1785 keV).

During the calibration, the Compton-edges relating to the 511 keV and 1274 keV features that are observed in the calibration spectrum (calculated or observed energy spectrum) are compared to a high quality reference spectrum (reference energy spectrum) of a Na-22 source obtained using a long exposure, for example, a spectrum might typically be based on a total of $10^6$ events. The processor 50 finds the median channel of the calibration spectrum ($M_C$) generated for the PMT and the median channel of a reference spectra ($M_R$). In this example the reference spectrum is stored in a memory of the control unit 50 in the form of a look-up table. The median for each $M_C$ and $M_R$ is found by ordering the counts in each spectrum by energy and finding the channels that contain the median counts.

If the median channels of the $M_R$ and $M_C$ are significantly different (e.g. 5%, 6%, 7% or 8%, different), the gain of the selected PMT is changed or corrected using the following formula:

$$\text{GainChange}=(\text{Gain})*M_R/M_C-\text{Gain}$$

where;

a) GainChange (i.e. gain-change) is the change that is required to normalize the energy calibration b) Gain is the current value of the gain of the selected PMT, c) $M_R$ is the median channel of the reference spectrum.

d) $M_C$ is the median channel of the calibration spectrum.

In this example the median is used, since the applicant has found that this works well in practice, but any percentile other than the median may be used.

The gain change signal is then fed to the amplifier of the selected PMT, in this example amplifier 44d. The signal is in the form of an analogue signal that is fed into the respective analogue multiplier as discussed above.

The above-description relates to the scenario when a gating signal G is received by the MCA 48. At all times, even when calibration events are received by the spectrometer 39, the summation apparatus 52 receives all the signals from the PMTs 42a, 42b, 42c, 42d where they are summed together. The summed signal is then passed to the MCA 54. However, when the summed signals received from the summation apparatus 52 are not related to a calibration event, the MCA 54 generates a spectrum based on the summed digitised signals, which is routed to a memory block of a data analysis process 56, where the un-known spectrum to be analysed is recorded. Although not shown it will be appreciated that the MCA 54 also receives the tagging signals from the circuits of the tagging source 20 to prevent the inclusion of calibration events in that spectrum.

The summed outputs that do not occur in coincidence with a gating signal G are routed to the MCA 54 and are assumed to relate to radiation in the environment being observed by the gamma-ray spectrometer 39, for example, in an item of cargo at a port, and not calibration source decay events. Thus the output signals routed to the MCA 54 correspond with the events of primary interest, and may be referred to as observed signal events. The MCA 54 is thus operable to generate an energy-loss spectrum for the observed signal events.

Once the stabilisation and calibration of the selected amplifier and PMT is complete, the switch 46 under the control of the controller 50 selects another PMT and associated amplifier and repeats the process. The calibration process is cycled for each PMT and associated amplifier.

In an alternate embodiment, the gain change can also be computed by simulating the effect of a range of gain changes on the calibration spectrum. This is done by rescaling the energy axis of the observed calibration spectrum (or calculated energy spectrum) and measuring the difference between the resulting rescaled observed spectrum and the $^{22}$Na reference spectrum (or reference energy spectrum). The difference can be measured in a variety of ways including the sum of the squared differences in the counts in each channel or by treating the spectra as probability distributions and using a $X^2$-test or measuring their cross entropy.

Once the value of the scaling factor that minimizes the difference measured is determined, the optimum gain change can be computed using the formula:

$$\text{GainChange}=\text{Gain}*\text{ScalingFactor}-\text{Gain}$$

where the a) GainChange (i.e. gain-change) is the change that is required to normalize the energy calibration b) Gain is the current value of the gain of the selected PMT, c) ScalingFactor is the difference between the rescaled calculated energy spectrum and rescaled reference energy spectrum.

In practice, the difference measured corresponding to a particular value of the scaling factor might need to be smoothed over a range of values in the neighbourhood of the value of interest in order to minimize the effects of sample variance and obtain a good estimate of the true difference.

Although updating a PM's gain based on either the medians of the two spectra or simulated gain changes are both effective, the former is more vulnerable to the effects of sample variance and the latter is more computationally intensive. Either technique can be used in isolation but they can also be used in combination. For example, the gain change that is obtained from the comparison of the percentiles (median) can be used to focus the simulation of gain-changes on a narrow range of gains that are most likely to be relevant, saving computational effort by eliminating the need to simulate a much larger range.

Despite a tagging process being used to generate the calibration spectrum, it is possible for this to become contaminated, particularly in the presence of extremely strong sources. To prevent such a contamination causing spurious gain-changes or calibration of the gain of the PMTs, sanity checks are performed on the calibration spectrum and gain changes are not made when contamination is detected. Several checks have been found to be useful in detecting contamination:

Check that the count-rate observed in the calibration spectrum is consistent with the count-rate in the reference spectrum. This can be done using a simple sigma test on the calibration count-rate assuming that the calibration acquisition was stopped after a fixed time or assuming that the calibration spectrum was stopped after a fixed number of counts.

Check that the calculated energy spectrum has the same shape as the reference energy spectrum after the former has been energy-scaled to match the latter as closely as possible. The same measures of difference that are used to find the best scaling-factor can be used to assess the extent of the difference in shape. If the observed tagged spectrum and the reference spectrum have the same shape and their energy scales are aligned, than their median channels should be very close. The difference between the median channels should not be greater than 15 channels.

Check that the gain change estimated from the medians is consistent with the gain change estimated by changing the energy scale. For a pure Na-22 calibration spectrum, both gain changes should be approximately the same. If the gain-changes are significantly different (e.g. by 1% or 2%), it suggests that the spectrum is contaminated.

It will be appreciated that although the above three steps are performed in relation to the embodiment of the invention, they may also be performed when stabilizing a single PMT.

Thus the Na-22 radioactive source can be used to:

a) Normalise the gain of each of the multiple PM tubes used to view the large volume PVT spectrometer.

b) Stabilise the gain of each of the PM tubes against changes in the environment temperature or other secular changes in the detector assembly.

c) Calibrate the energy-loss spectrum acquired by the detector and thereby maintain the integrity of the derived 'most probable incident gamma-ray spectrum' to within 1 to 2%.

Therefore, each of the individual spectrometer spectra that are summed, do not contribute to a loss of resolution or isotope identification capability in the summed spectra. Further, since the stabilisation system provides the ability to record the dual-energy response of the spectrometer at 511 and 1274 keV, this system also can provide a check on the linearity of the multichannel analyser and any drift in the off-set of the analyser from zero.

REFERENCES

1. Energy Calibration of plastic scintillators using Compton kinematics by E Siciliano et al, Nuclear Instruments and Methods 594, (2008), pages 232-243.
2. Energy calibration of plastic scintillators for low energy electrons by N Kudomi, Nuclear Instruments and Methods 430, (1999), pages p 96-99.
3. A 207Bi light pulser for stabilisation of scintillators and lead-glass Cherenkov detectors, Nuclear Instruments and Methods 174, (1980), pages 411-419.
4. Characterisation and calibration of large volume PVT detectors using tagged gamma-ray sources by G. Pausch et al, IEEE—Nuclear Science Symposium, Valencia (2011).

The invention claimed is:

1. An apparatus comprising a calibration source and a gamma-ray spectrometer arranged to receive gamma-rays from the calibration source, the gamma-ray spectrometer comprising:
a scintillator material optically coupled to two or more photomultipliers, the two or more photomultipliers being arranged to detect photons generated in the scintillator material associated with gamma-ray interactions between the scintillator material and gamma-rays received from the calibration source, wherein the two or more photomultipliers are operable to output respective detection signals associated with the gamma-ray interactions;

the calibration source comprising:
a radioactive material having a decay transition associated with emission of a radiation particle and a gamma-ray, a detector arranged to receive radiation particles emitted from the radioactive material, and a gating circuit coupled to the detector and arranged to output a gating signal in response to a detection of a radiation particle by the detector:

the apparatus further comprising:
a switch coupled to receive the respective detection signals from the two or more photomultipliers and operable to select detection signals from one of the two or more photomultipliers; and
a stabilization circuit coupled to the switch and the gating circuit, wherein the stabilization circuit is operable to receive the selected detection signal of the respective photomultiplier and to stabilize the gain of the photomultiplier that output the selected detection signals based on the detection signals measured in association with gating signals from the gating circuit.

2. The apparatus according to claim 1, wherein the stabilization circuit is operable to generate and output a control signal to the switch for selecting the detection signals of one of the two or more photomultipliers.

3. The apparatus according to claim 1, wherein the stabilization circuit is operable to generate a gain-change signal for the photomultiplier associated with the selected detection signals based on a comparison of an observed energy spectrum calculated from the selected detection signals and a reference energy spectrum of the calibration source.

4. The apparatus according to claim 3, wherein the control circuit is operable to output the gain-change signal to the photomultiplier associated with the selected detection signals.

5. The apparatus according to claim 3, wherein the stabilization circuit is operable to compare Compton-edges of the observed energy spectrum and the reference energy spectrum of the radioactive material in the calibration source.

6. The apparatus according to claim 3, wherein the stabilization circuit is operable to compare the median channel of the reference energy spectrum and the median channel of the observed energy spectrum.

7. The apparatus according to claim 3, wherein the stabilization circuit is operable to compare the median channel of the reference energy spectrum and the median channel of the observed energy spectrum, rescale the energy axis of the observed energy spectrum and measure the difference between the rescaled energy spectrum and the reference energy spectrum, and determine if a gain-change estimated from the medians is consistent with a gain change estimated by rescaling the energy spectrums.

8. The apparatus according to claim 3, wherein the stabilization unit is operable to compare the count-rate in the observed energy spectrum with the count-rate observed in the reference energy spectrum.

9. The apparatus according to claim 1, comprising: a data acquisition circuit operable to process the selected detection signals associated with a radioactive material in the calibration source and output an energy spectrum associated with the radioactive material in the calibration source.

10. The apparatus according to claim 1, wherein the stabilization circuit is operable to rescale the energy axis of the observed energy spectrum and measure the difference between the rescaled energy spectrum and the reference energy spectrum.

11. The apparatus according to claim 10, wherein the stabilization unit is operable to rescale the calibration spectrum with reference to the reference spectrum and compare the shape of the rescaled calibration spectrum with the shape of the reference spectrum.

12. The apparatus according to claim 1, wherein each of the two or more photomultipliers comprises an amplifier.

13. A method for calibrating a gamma-ray spectrometer, comprising the steps of:

providing a calibration source and a gamma-ray spectrometer arranged to receive gamma-rays from the calibration source; the gamma-ray spectrometer comprising: a scintillator material optically coupled to two or more photomultipliers, the two or more photomultipliers being arranged to detect photons generated in the scintillator material associated with gamma-ray interactions between the scintillator material and gamma-rays received from the calibration source, wherein the two or more photomultipliers are operable to output respective detection signals associated with the gamma-ray interactions, and the calibration source comprising: a radioactive material having a decay transition associated with emission of a radiation particle and a gamma-ray, a detector arranged to receive radiation particles emitted from the radioactive material, and a gating circuit coupled to the detector and arranged to output a gating signal in response to a detection of a radiation particle by the detector;

detecting photons generated in the scintillator material associated with gamma-ray interactions between the scintillator material and gamma-rays received from the calibration source;

selecting detection signals from one of the two or more photomultipliers; and stabilizing the gain of the photomultiplier associated with the selected detection signal based on the detection signals measured in association with gating signals from the gating circuit.

* * * * *